(12) United States Patent
Rentz et al.

(10) Patent No.: US 11,346,380 B2
(45) Date of Patent: May 31, 2022

(54) LOCKING CONNECTOR

(71) Applicant: Gregory E. Summers, Madison Heights, VA (US)

(72) Inventors: Marc Rentz, Madison Heights, VA (US); Gregory E. Summers, Amherst, VA (US); Tristan Mason, Madison Heights, VA (US)

(73) Assignee: Gregory E. Summers Trust Agreement Dated Dec. 8, 2006, Madison Heights, VA (US)

( * ) Notice: Subject to any disclaimer, the term of this patent is extended or adjusted under 35 U.S.C. 154(b) by 465 days.

(21) Appl. No.: 16/503,902

(22) Filed: Jul. 5, 2019

(65) Prior Publication Data

US 2021/0003154 A1    Jan. 7, 2021

(51) Int. Cl.
*F16B 5/06* (2006.01)
*F41B 5/14* (2006.01)

(52) U.S. Cl.
CPC .......... *F16B 5/0621* (2013.01); *F41B 5/1403* (2013.01); *F41B 5/1426* (2013.01)

(58) Field of Classification Search
CPC ................. F41B 5/1426; F41B 5/1403; Y10T 403/5741; F16B 5/0621; F16B 37/041
See application file for complete search history.

(56) References Cited

U.S. PATENT DOCUMENTS

| | | | | |
|---|---|---|---|---|
| 3,216,755 A * | 11/1965 | Sim | ........................... | F16D 1/02 403/306 |
| 4,701,065 A * | 10/1987 | Orosa | ....................... | A47C 5/02 403/263 |
| 4,783,189 A * | 11/1988 | Bugg | .................... | E04B 1/2604 403/264 |
| 5,524,601 A * | 6/1996 | Slates | ................... | F41B 5/1426 124/87 |
| 5,685,286 A * | 11/1997 | Summers | .............. | F41B 5/1469 124/35.2 |
| 6,179,510 B1 | 1/2001 | Meicke et al. | | |
| 6,712,057 B2 * | 3/2004 | Andrews | ............... | F41B 5/0026 124/23.1 |
| 7,308,890 B1 * | 12/2007 | Wheeler | ................... | F41B 5/10 124/23.1 |
| 9,377,269 B2 * | 6/2016 | Bidigare | ................... | F41B 5/10 |

\* cited by examiner

*Primary Examiner* — Matthew R Mcmahon
(74) *Attorney, Agent, or Firm* — Leading Edge Law Group, PLC

(57) ABSTRACT

A connector includes a base and a nut which is configured to fit within and be retained within a chamber in the base. The nut is laterally inserted into the chamber via a side opening in the base and is axially displaced within the chamber between locked and unlocked positions. The nut includes a radial projection which is configured to enter into a bore in the base adjacent to the chamber when the nut is in the locked position. When the nut is in the released position, the projection is withdrawn from the bore so that the nut may be removed from the base.

5 Claims, 4 Drawing Sheets

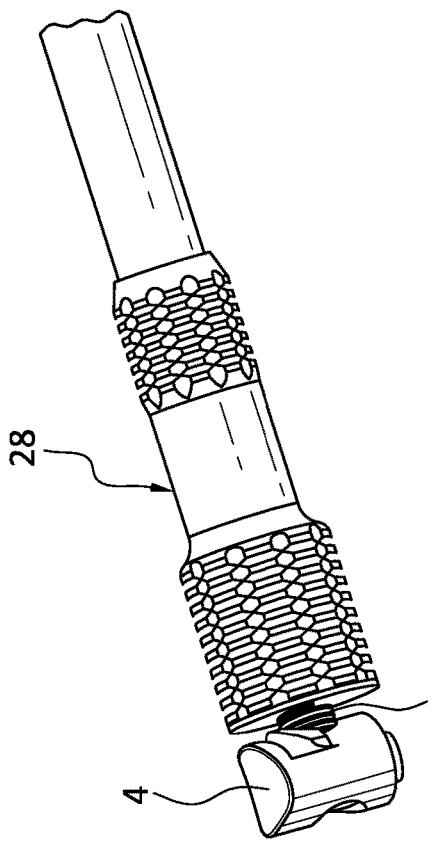
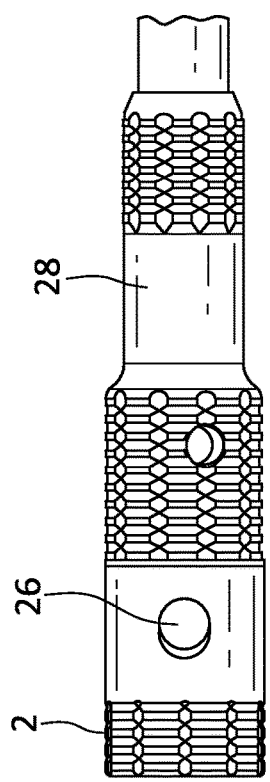
FIG. 20
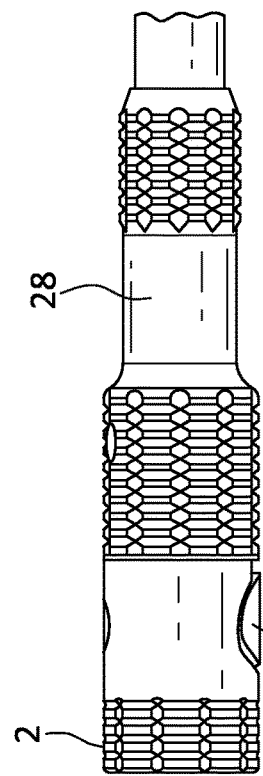
FIG. 19
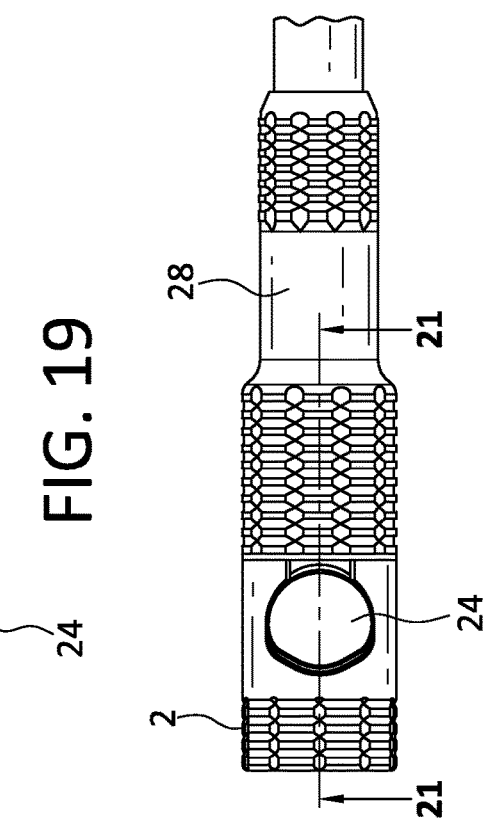
FIG. 18
FIG. 17
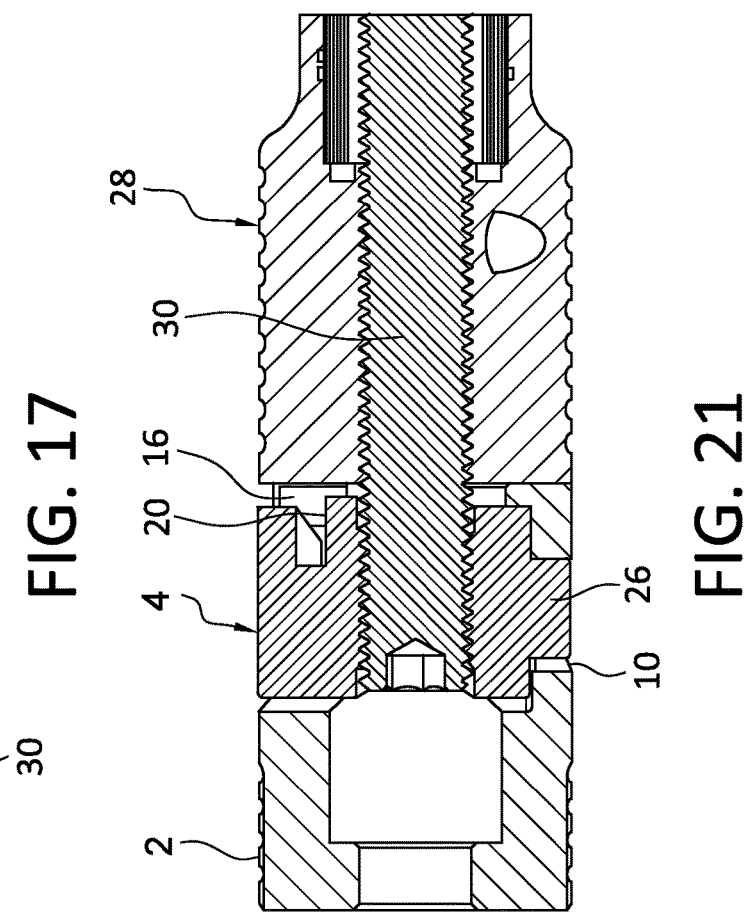
FIG. 21

LOCKING CONNECTOR

BACKGROUND OF THE DISCLOSURE

Professional archers often use a stabilizer with their bow to improve their accuracy. Similarly, hunters may also use a stabilizer. A stabilizer is typically screwed into an accessory hole on the bow, whether it is a compound or an Olympic bow. The stabilizer resists torque and absorbs vibrations in the bow when shot, thereby reducing the shock felt in the archer's hand on the bow grip. It also helps keep the bow balanced and settles the archer's arm during aiming.

As a result of the vibrations in the bow, it is not uncommon for stabilizers to come loose and partially disconnect or unscrew from the bow. Not only does this diminish the effectiveness of the stabilizer, but the time and effort required to repeatedly tighten the stabilizer on the bow becomes frustrating to an archer and can distract the archer's concentration. It is also common for an archer to remove a stabilizer or replace it with a stabilizer of a different size or configuration.

Accordingly, there is a need for an archery connector which provides a secure connection of a stabilizer or other accessory with a bow while also allowing the archer to quickly and easily disconnect the accessory from the bow.

BRIEF DESCRIPTION OF THE PRIOR ART

Archery connection systems which afford rapid connection and disconnection of an accessory such as a stabilizer with a bow are known in the art as evidenced by the Meicke et al U.S. Pat. No. 6,179,510. This prior connection system utilizes a key pin that is arranged within and connected with a base mount. A beveled washer is provided to keep the stabilizer centered relative to the base and to prevent the key pin and stabilizer from inadvertently sliding out of the base if the stabilizer is loosened as a result of vibrations from the bow.

While the prior connection system operates satisfactorily, it is somewhat cumbersome in that multiple components, namely the key pin, washer, and a nut, are required for the connecting the stabilizer with the bow.

SUMMARY OF THE INVENTION

The present disclosure describes an improved locking connector which includes only a base and a specially configured nut which is removably connected with the base. More particularly, the base has a generally cylindrical configuration and contains a chamber and a side opening in a surface of the base. The nut also has a cylindrical configuration and is designed for insertion into the chamber via the side opening. The nut is displaced within the chamber between locked and unlocked positions.

The chamber preferably includes an end opening in a surface of the base normal to the surface containing the side opening. The nut contains a threaded through opening having an axis which is normal to the axis of the nut. A threaded tool such as the shaft of a stabilizer passes through the end opening for connection with the threaded through opening of the nut. Rotation of the tool displaces the nut within the chamber between the locked and unlocked positions.

The nut also includes an arcuate projection which at least partially surrounds the threaded through opening. The projection extends beyond the exterior surface of the nut. When the tool is operated in a locking direction, the nut is displaced along the shaft within the base chamber and the projection passes into a bore at the edge of the chamber where it engages a surface of the base surrounding the bore to lock the nut in place. Partial rotation of the tool in an unlocking direction disengages the projection from the base surface surrounding the bore. However, a full revolution of the tool is required to displace the nut sufficiently so that the projection exits the bore, thereby allowing the nut to be removed from the chamber via the side opening.

A boss extends from an end surface of the nut and is arranged in a through opening in the base when the nut is inserted into the chamber. When the nut is displaced to the locked position, the boss engages the surface of the base surrounding the through opening to further secure the nut in the locked position.

BRIEF DESCRIPTION OF THE FIGURES

Other objects and advantages of the connector will become apparent from a study of the following specification when viewed in the light of the accompanying drawing, in which:

FIG. 17 is a perspective view of the nut of the connector assembly connected with an archery stabilizer;

FIGS. 18, 19, and 20 are front, top and bottom plan views of the connector assembly with a stabilizer attached to the nut of the connector; and FIG. 21 is a sectional view of the connector assembly taken along line 21-21 of FIG. 18

DETAILED DESCRIPTION

Figure 1:
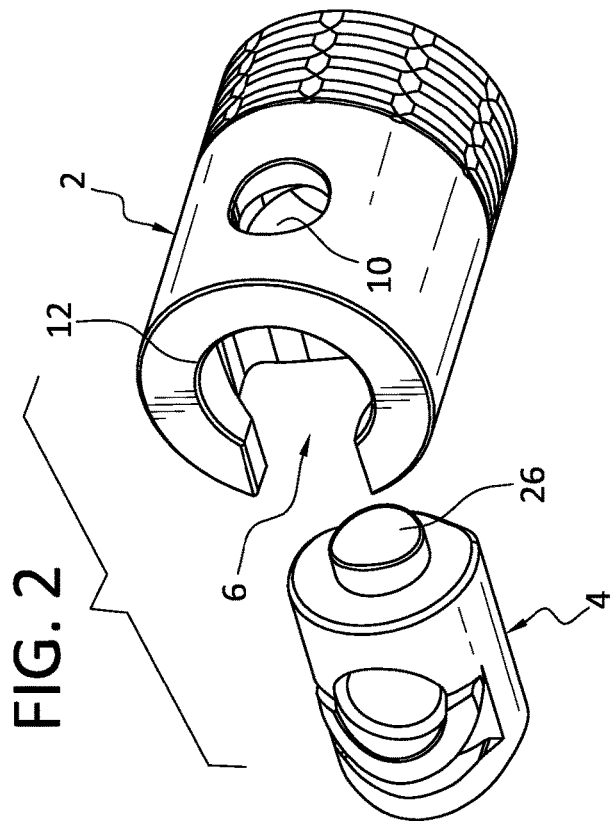
FIGS. 1 and 2 are front and side exploded perspective views, respectively, of the components of a connector assembly.
Figure 2:
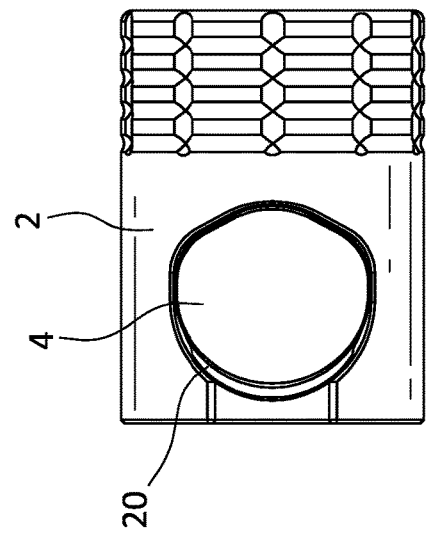

Referring first to FIGS. 1 and 2, the connector assembly includes a base 2 and a nut 4. The base is shown in more detail in FIGS. 5-10 and the nut is shown in more detail in FIGS. 11-16. Both the base and nut are formed of a rigid material such as metal or synthetic plastic. Preferred metals are stainless steel and aluminum.

The base 2 has a cylindrical configuration and contains a generally cylindrical chamber 6. The axis of the chamber extends normal to the axis of the base. The side wall of the base contains an opening 8 which affords access to the chamber for the nut as will be described below. The portion of the side wall opposite the opening 8 contains a through opening 10. The end wall of the base also contains an opening 12 which communicates with the chamber. It should be noted that the side 8 and end 12 openings have axes which are arranged normal to each other and that the openings merge in an edge of the base between the side and end walls.

Figure 6:
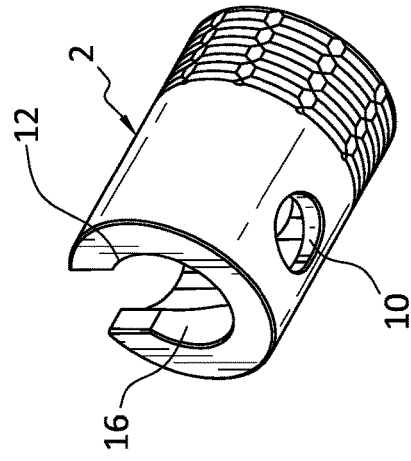
Figure 5:
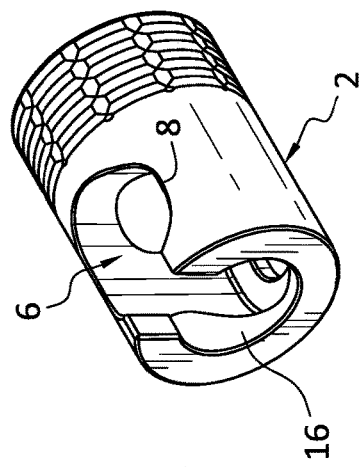

The end of the base opposite the chamber end 12 contains an opening 14 for connection with a bow, bar, or other accessory via a cap screw or other fastener (not shown). The base further contains a bore 16 adjacent to the chamber 6 as shown in FIGS. 5 and 6.

Figure 14:
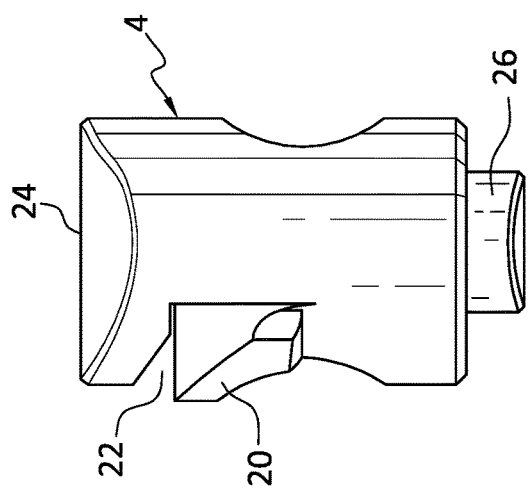
FIG. 14 is a right side elevation view of the nut.
Figure 16:
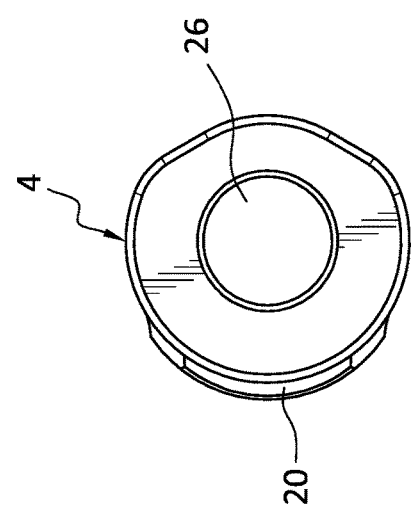
FIG. 16 is a bottom plan view of the nut.

The nut 4 has a cylindrical configuration which matches that of the base chamber though with a slightly smaller diameter so that the nut may be inserted into and removed from the chamber via the side opening 8. When the nut is arranged in the chamber, the nut axis is co-linear with the axis of the chamber. The nut contains a threaded through opening 18 having an axis which extends normal to the axis of the nut. At least partially surrounding the opening 18 is an arcuate projection 20. As shown in FIG. 14, the projection extends radially outwardly from the nut to a distance slightly beyond the exterior surface of the nut. In a preferred embodiment, the arcuate portion is a half round in that it extends about halfway around the threaded opening. However, the projection may extend more or less than half way around the opening. The exterior surface of the nut further contains a recess 22 in an area above the arcuate portion.

Figure 15:
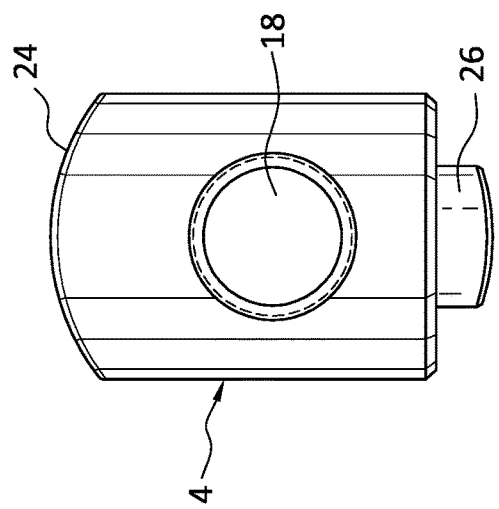
FIG. 15 is a rear elevation view of the nut.
Figure 12:
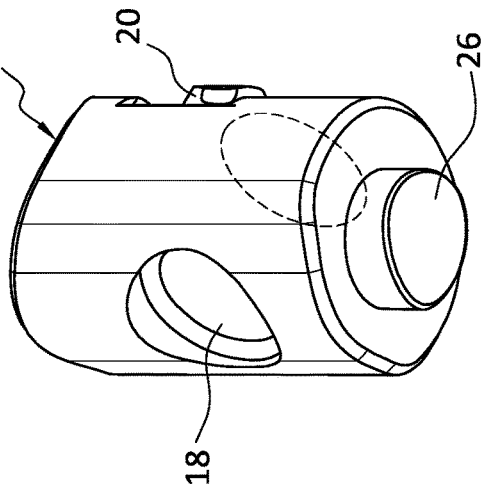
FIGS. 11 and 12 are bottom front and bottom rear perspective views, respectively, of a nut of the connector assembly of FIGS. 1 and 2.
Figure 13:
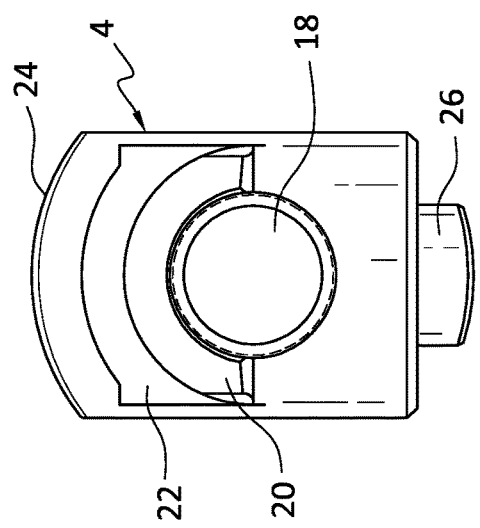
FIG. 13 is a front elevation view of the nut.
Figure 11:
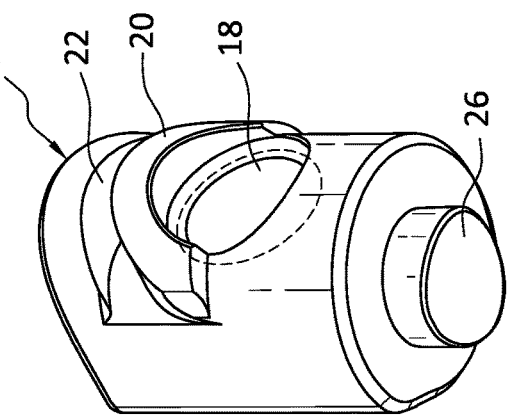

As shown in FIGS. 13-15, the top surface 24 of the nut has a convex configuration. This matches the curvature of the outer surface of the base when the nut is inserted into the base chamber as shown for example in FIG. 19. The bottom surface of the nut includes a cylindrical boss 26 extending therefrom.

The operation of the connector assembly will now be described. As shown in FIG. 17, a stabilizer 28 is connected with the nut 4. The stabilizer includes a threaded portion 30 extending from one end which is threadably connected with the threaded opening 18 of the nut. With the stabilizer attached, the nut is inserted into the chamber of the base via the side opening 8. As shown in FIGS. 1 and 2, the boss end of the nut is inserted first. During insertion of the nut, the stabilizer passes through the opening 12 in the end portion of the base. When fully inserted, the boss of the nut extends into the opening 10 of the base as shown in FIG. 20. The top end surface 24 of the nut is arranged flush with the outer surface of the base as shown in FIG. 19.

Figure 3:
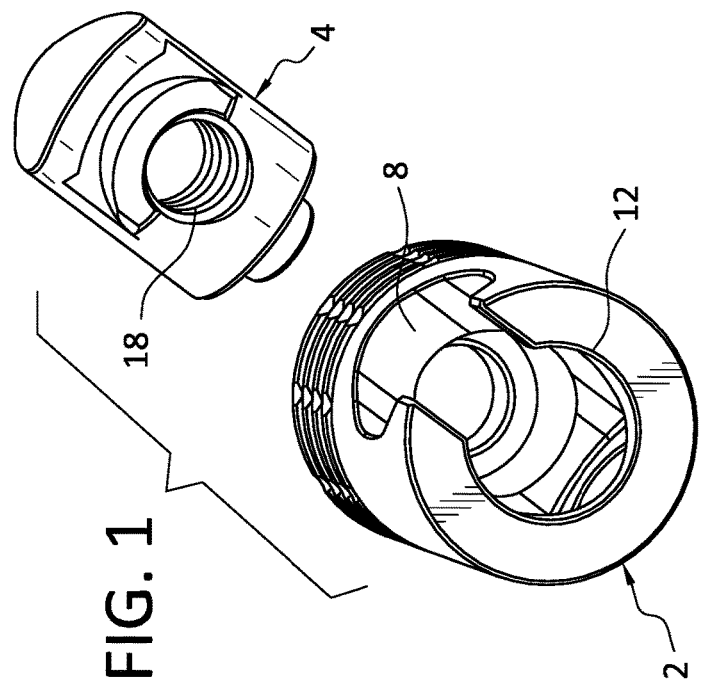
FIGS. 3 and 4 are side views of the connector in unlocked and locked positions, respectively.
Figure 4:
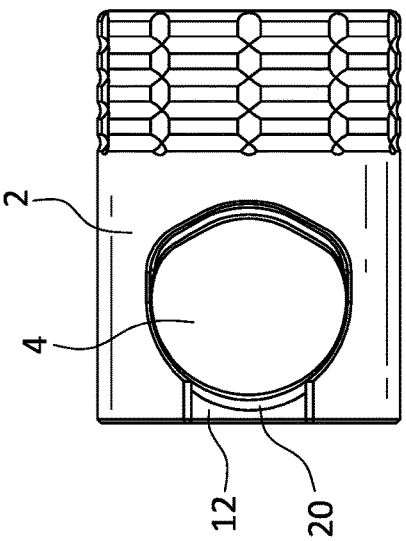
Figure 8:
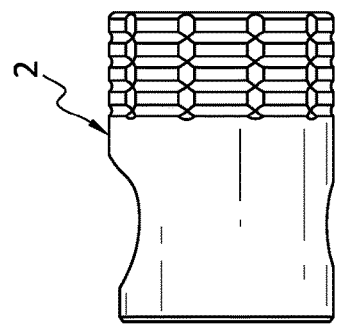
FIG. 8 is a front elevation view of the base.
Figure 9:
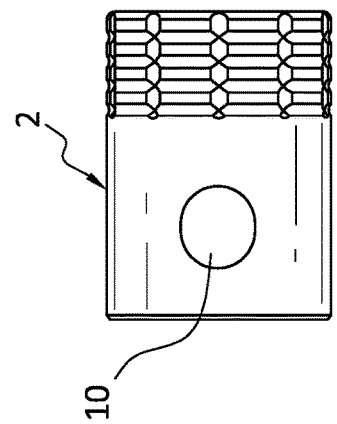
FIG. 9 is a rear elevation view of the base.
Figure 7:
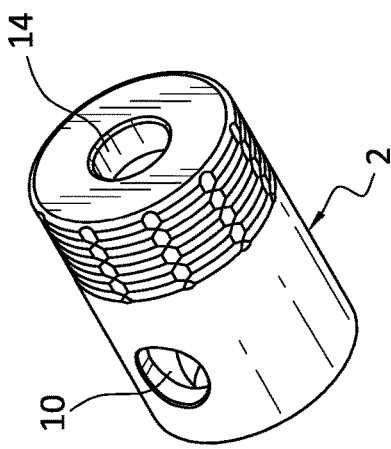
FIGS. 5, 6 and 7 are top, bottom, and side perspective views, respectively, of a base of the connector assembly of FIGS. 1 and 2.
Figure 10:
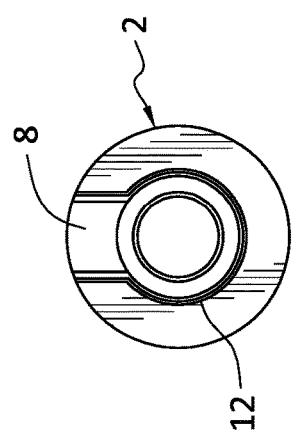
FIG. 10 is a left side elevation view of the base.

When initially inserted into the base chamber, the nut is in an unlocked position. Rotation of the stabilizer in the locking direction displaces the nut along the threaded portion of the stabilizer within the base chamber. Thus, the nut is displaced in the direction of the axis of the base. As the nut is displaced, the arcuate projection 20 enters the bore 16 of the base at the edge of the chamber. Simultaneously, the boss 26 engages a wall of the base surrounding the opening 10. FIG. 21 shows the nut in the locked position with the arcuate portion 20 in the bore 16 and the boss 26 engaging the inner wall surrounding the opening 10 in the base 4. When the nut is in the locked position, the arcuate projection 20 is arranged within the bore 16 and the front radial pin shape surface of the nut engages the mating bore surfaces of the base on both sides of opening 8 to tighten the nut as shown in FIG. 3, thereby preventing the nut from being removed from the base. Thus in FIG. 3, only a portion of the arcuate projection 20 is visible from the top. Rotation of the stabilizer in the opposite direction displaces the nut to its unlocked position which is shown in FIG. 4. As shown therein, the full extent of the arcuate projection is visible because the axial movement of the nut toward the unlocked position removes the arcuate projection from the bore. When in this unlocked position, the nut may be slid out of the base chamber 6 and removed from the base via the side opening 8.

The arcuate projection 20 and the boss 26 of the nut provide two points of reference and engagement of the nut with the base to keep the nut, and thus the stabilizer connected with the nut, centered with respect to the base. The projection and boss also serve to define the proper orientation of the nut for insertion into the base chamber. That is, the nut will not fit into the chamber if the nut is not properly oriented.

A unique feature of the connector is that it may be assembled and disassembled with only one full revolution of the stabilizer. After insertion of the nut into the base chamber, partial rotation of the stabilizer displaces the nut sufficiently that the arcuate projection at least partially enters the bore, thereby preventing the nut from sliding out of the chamber, even though the nut is still somewhat loosely arranged in the chamber. Further rotation for a complete revolution of the stabilizer displaces the nut to its locked position with the arcuate projection fully engaged within the bore and the boss fully engaged with the base within the through opening. Conversely, partial rotation of the stabilizer in the opposite direction but less than one full revolution slightly displaces the nut from its locked position but the displacement is not sufficient to fully remove the arcuate projection from the bore. Thus, the nut is still retained in the base chamber. After a full revolution of the stabilizer, the nut is fully released and in the unlocked position so that it can be removed from the chamber and base.

While the connector has been described for use in attaching a stabilizer to a bow, it will be apparent that it may also be used to connect other objects. The stabilizer may also be replaced by a rotary tool which is used to displace the nut axially within the base chamber.

While the preferred forms and embodiments of the archery stabilizer tube have been illustrated and described, it will be apparent to those of ordinary skill in the art that various changes and modifications may be made without deviating from the novel concepts thereof.

What is claimed is:

1. A connector, comprising
   (a) a base containing a chamber and a side opening in a surface of said base;
   (b) a nut removably connected with said base and containing a threaded through opening having an axis normal to an axis of said nut and an arcuate projection arranged adjacent to said threaded through opening, whereby when a tool is arranged within said threaded through opening and rotated with respect to said nut, said nut is displaced between a locked position wherein said nut is arranged and retained within said chamber with said arcuate projection extending beyond an outer surface of said nut and engaging an inner surface of said base and an unlocked position wherein said nut is removable from said chamber via said side opening.

2. A connector as defined in claim 1, wherein said chamber and said nut have a generally cylindrical configuration, a diameter of said nut being less than a diameter of said chamber to provide a limited amount of movement of said nut between said locked and unlocked positions.

3. A connector as defined in claim 1, wherein said base contains a through opening which communicates with said chamber and wherein said nut includes a boss extending from an end surface thereof, said boss being arranged in said through opening when said nut is arranged in said chamber and said boss engages a surface of said base which defines said through opening when said nut is in the locked position.

4. A connector as defined in claim 3, wherein said base contains an end opening arranged normal to said side opening and communicating with said chamber, the tool extending from said nut threaded through opening through said end opening.

5. A connector as defined in claim 4, wherein said arcuate projection extends at least partially around said threaded through opening of said nut and enters said end opening when said nut is in the locked position.

* * * * *